United States Patent [19]
Pierce

[11] 3,869,934
[45] Mar. 11, 1975

[54] BELT TENSIONING TOOL
[76] Inventor: Philip F. Pierce, 4459 S. Kirk Rd., Vassar, Mich. 48768
[22] Filed: Sept. 12, 1973
[21] Appl. No.: 396,552

Related U.S. Application Data
[63] Continuation-in-part of Ser. No. 169,320, Aug. 5, 1971.

[52] U.S. Cl......... 74/242.12, 74/242.14 R, 308/305
[51] Int. Cl.............................................. F16h 7/10
[58] Field of Search............ 74/242.13 A, 242.14 R, 74/242.12; 403/287, 292, 301, 304, 305, 306, 307; 287/DIG. 7; 285/321, 223, 340; 64/4, 9

[56] References Cited
UNITED STATES PATENTS

| | | | |
|---|---|---|---|
| 858,131 | 6/1907 | Aichele | 287/DIG. 7 |
| 1,464,386 | 8/1923 | Ingram | 287/DIG. 7 |
| 1,817,414 | 8/1931 | Korth | 403/301 |
| 1,920,444 | 8/1933 | Thoen | 74/242.13 A |
| 2,038,869 | 4/1936 | Rader | 287/DIG. 7 |
| 2,074,078 | 3/1937 | Swift | 74/242.13 A |
| 2,263,438 | 11/1941 | Garvin | 74/242.14 R |
| 2,654,234 | 10/1953 | Christensen | 403/305 |
| 2,855,206 | 10/1958 | Haviland | 403/305 |
| 3,118,315 | 1/1964 | Loosli | 74/242.12 |
| 3,325,095 | 6/1967 | Mueller et al. | 74/242.14 R |

Primary Examiner—Samuel Scott
Assistant Examiner—Allan R. Burke
Attorney, Agent, or Firm—Learman & McCulloch

[57] ABSTRACT

A tool for tensioning a belt trained around a pair of relatively movable, peripherally grooved pulleys comprises a body having a chamber open at one end and a wall at the other end having a threaded opening therein, a pair of pulley-engaging members extending from opposite ends of the body. One of the members is rotatably accommodated in the chamber of the body and the other of the members has a threaded shank which is accommodated in the threaded wall of the chamber, and each of the members has an arcuate bearing arm adapted to be accommodated in the grooves of the respective pulleys so as to bear against the latter and be restrained against rotation relative to the pulleys. The body preferably has a fairly large diameter and a multi-sided exterior so as to enable it to be rotated by hand or by a wrench, whereupon that member having the threaded shank will be extended or retracted relatively to the body so as to increase or decrease the overall length of the tool. The member which extends into the chamber preferably has a socket for the accommodation of the threaded shank or for one end of an extension, which may be interposed between the body and such member so as to enable the overall length of the tool to be varied independently of the threaded member.

10 Claims, 4 Drawing Figures

PATENTED MAR 11 1975          3,869,934

3,869,934

BELT TENSIONING TOOL

RELATED APPLICATION

This application is a continuation-in-part of application Ser. No. 169,320, filed Aug. 5, 1971.

This invention relates to a tool which is particularly adapted to be interposed between a pair of peripherally grooved, relatively movable pulleys around which a belt is trained and which is capable of exerting a force on the pulleys tending to move them apart so as to tension the belt. The tool comprises essentially a body from the opposite ends of which extend members adapted to bear against the pulleys, the arrangement being such that rotation of the body in one direction effects elongation of the tool so as to move the pulleys apart. The tool may include one or more extensions, however, which may be interposed between one of the bearing members and the body.

It is common practice in the automotive industry to couple a vehicle's crank shaft to devices such as a fan, a generator, a power steering unit, an air conditioning unit, and the like. The coupling means conventionally comprises a belt trained around a grooved pulley on the vehicle's crank shaft and a grooved pulley carried by the device to be coupled to the crank shaft. The device adapted to be driven from the crank shaft normally is mounted for movement toward and away from the latter so as to enable the distance between the drive pulley and the driven pulley to be varied, thereby making it possible to substitute a new belt for a worn belt and provide proper tension on the driving belt.

In the substitution and adjustment of a belt it is common practice to loosen the securing means of the movable, belt-driven unit and move the latter toward the driving pulley so as to facilitate installation of a belt on both pulleys. A crowbar or the like then is used to impose a force on the unit tending to move it away from its driving unit to effect tensioning of the driving belt, whereupon the securing means then are tightened while attempting to hold the drive unit in its adjusted position. This kind of operation is difficult to be performed by one person inasmuch as one hand must be used to maintain the force on the driven unit while the other hand is used to manipulate the securing means.

In many cases, there is insufficient room in the engine compartment of a vehicle to accommodate a crowbar or the like, thereby necessitating the use of some other kind of tool or requiring the services of more than one person. These problems have been recognized heretofore and various kinds of tools have been proposed to facilitate tensioning of driving belts. Such tools, however, have not been altogether satisfactory for a number of reasons. For example, some of the proposed tools have had limited applicability in that they could function effectively on only one or relatively few of the driven devices. Others of the previously proposed tools have been composed of a fairly large number of parts, thereby complicating their use and adding to their expense.

An object of this invention is to provide a belt tensioning tool which overcomes the disadvantages of other tools adapted for similar purposes.

Another object of this invention is to provide a belt tensioning tool composed of few parts which are easy and inexpensive to manufacture and use.

A further object of the invention is to provide a belt tensioning tool which is adapted for use between any pair of belt-driven pulleys, regardless of the distance therebetween.

Other objects and advantages of the invention will be pointed out specifically or will become apparent from the following description when it is considered in conjunction with the appended claims and the accompanying drawings, in which:

Figure 1:
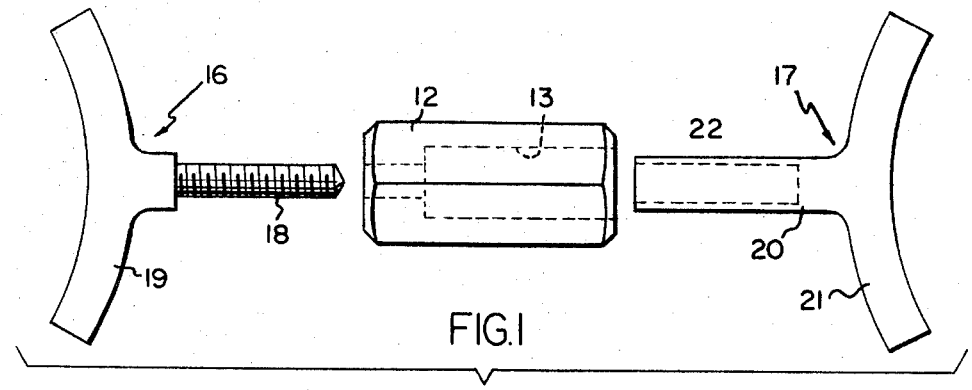
FIG. 1 is an exploded, elevational view of a tool constructed in accordance with the invention.
Figure 2:
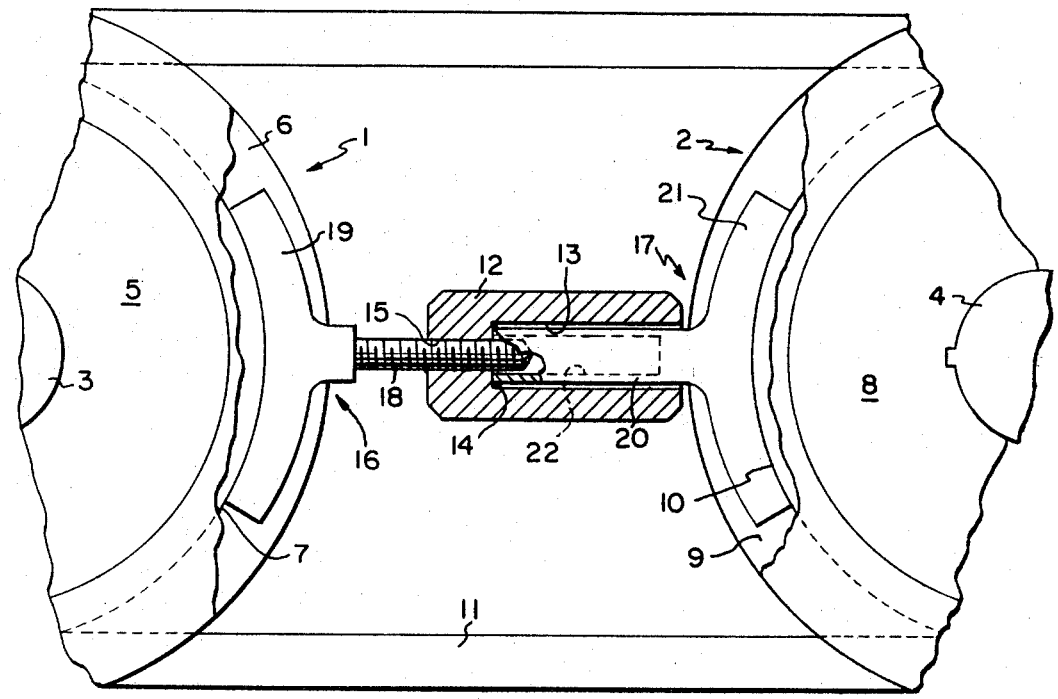
FIG. 2 is a fragmentary, elevational view of a pair of pulleys having a belt trained therearound and illustrating the tool in use, certain parts of the tool being shown in section for purposes of clarity.
Figure 3:
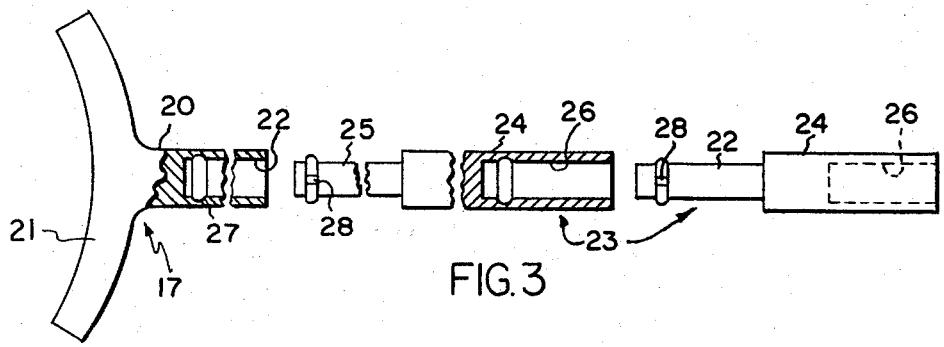
FIG. 3 is an exploded, partly sectional and partly elevational view of extensions adapted for the tool shown in FIGS. 1 and 2.

A tool constructed in accordance with the disclosed embodiment of the invention is adapted for use in conjunction with a pair of spaced apart pulleys 1 and 2, the pulley 1 being fixed on a shaft 3 and the pulley 2 being fixed on a shaft 4. The shaft 3 may comprise the crank shaft of a vehicle engine and the shaft 4 may comprise the driven shaft of a power steering unit (not shown) or the like, the unit being shiftable in the conventional manner so as to enable the shaft 4 to be moved toward and away from the shaft 3. The pulley 1 comprises a wheel 5 having a groove 6 at its periphery, the groove having a base 7. The pulley 2 is similar to the pulley 1 and comprises a wheel 8 having a groove 9 at its periphery, the groove having a base 10. Trained around the pulleys 1 and 2, and fitted into the grooves 6 and 9 is an endless belt 11 which is capable of transmitting rotation of the pulley 1 to the pulley 2.

A tool constructed according to the invention comprises a body 12 having a fairly large diameter, such as 1¼ inches, so as to facilitate its being rotated by hand. The body may have a hexagonal or other multi-sided exterior, however, so as to enable it to be rotated by means of a wrench if desired. The body 12 defines a cylindrical chamber 13 which is open at one end and has a wall 14 at its other end. The wall has a threaded opening 15 which is coaxial and communicates with the chamber 13.

The tool includes a pair of bearing members 16 and 17 which are adapted to extend from opposite ends of the body 12. The member 16 has a threaded shank 18 adapted for threaded accommodation in the opening 15, the shank being joined to an arcuate arm 19. The member 17 comprises a cylindrical stem 20 having an exterior diameter corresponding substantially to the diameter of the chamber 13 so as snugly, but rotatably, to be accommodated in the latter. The stem is joined to an arcuate arm similar to the arm 19. The stem also includes at its free end an axially extending socket 22 having a diameter sufficiently greater than that of the threaded shank 18 to accommodate the latter.

In the operation of the apparatus thus far described, the member 17 may be fitted into the socket 13 of the body 12 and the shank 18 of the member 16 introduced to the opening 15 and rotated in such direction as to thread the shank into the body until the overall length of the assembled parts is such as to permit it to be introduced between the pulleys 1 and 2.

Following positioning of the tool between the pulleys 1 and 2, the arms 19 and 21 should be oriented so that they confront and are aligned with the grooves 6 and 9 so that the arms are precluded from rotation by the sides of the respective grooves. The body 12 then may be rotated by hand or by means of a wrench or the like in such direction as to cause the shank 18 to be extended from the body so that the arms 19 and 21 bear against the bases 7 and 10 of the respective pulley grooves and force the pulleys apart. Rotation of the body 12 may continue until the overall length of the tool has been extended to a degree such that the spacing between the pulleys 1 and 2 is sufficient to impose proper tension on the belt 11. Thereafter, the unit on which the movable pulley 2 is supported may be fixed so as to maintain the spacing between the pulleys constant. The body 12 then may be rotated in the opposite direction so as to effect retraction of the shank 18 into the body an amount sufficient to enable the tool to be removed from between the pulleys.

In some instances the spacing between the pair of pulleys may be greater than that capable of being spanned by the assembled parts 12, 16 and 17. In such instances one or more extension members 23 may be employed. Each extension comprises a first, cylindrical portion 24 having an outside diameter corresponding substantially to the diameter of the stem 20 of the member 17 and a second portion 25 extending in prolongation of the portion 24 and having a diameter such as to fit snugly, but rotatably, into the socket 22 formed in the stem 20. The body portion 24 preferably includes a socket 26 like the socket 22 so as to enable a plurality of extensions 23 to be assembled in end-to-end relation.

Radially expansible and contractile retaining means preferably is provided on each of the extension members 25 and in each of the sockets 26 to enable the members 17 and 23 separably to be retained in assembled relation. The retaining means preferably comprises a rubber or rubbery O-ring 29 seated in an endless groove formed in each of the members 25, the ring 29 being carried at the inner periphery of a resilient, split metal ring. The retaining means also may include an annular groove 27 formed in each of the sockets 26 in such position as to receive the companion rings 27 and 28 when a part 25 is fitted into a socket 26. It is not essential that the groove 29 be provided in a socket. The inherent tendency of the ring 27 to expand will cause the ring 28 to engage the wall of the socket with sufficient friction to retain the parts assembled.

The length of each body part 25 preferably corresponds to the depth of any socket 22 or 26 so that the stem 20 and the extensions 23 constitute, in effect, a single member composed of multiple parts so as to enable the tool to exert substantial force along its longitudinal axis. The use of the tool with one or more extensions is the same as has been described earlier.

Figure 4:
FIG. 4 is a cross-sectional view of a detail.

In order to enable the tool to be adaptable to a wide range of pulley sizes, the sides of the arms 19 and 21 may be ground to form flat surfaces 30, as is shown in FIG. 4, which taper along lines which converge toward a point corresponding substantially to the center of the arc on which the arms are formed. The flat surfaces enable the radially inner edge of each arm to seat on the root of the pulley groove and avoids imposing forces on the sides of the pulley groove.

The disclosed embodiment is representative of a presently preferred form of the invention, but is intended to be illustrative rather than definitive thereof. The invention is defined in the claims.

I claim:

1. A tool for tensioning a belt trained about a pair of spaced apart pulleys at least one of which is movable toward and away from the other, said tool comprising a body adapted to be interposed between said pulleys and defining a chamber open at one end of said body and a threaded opening at its other end communicating with said chamber; a first member having one end thereof, rotatably and slidably accommodated in said chamber, bearing against said body, the other end of said first member extending outwardly from said one end of said body; a second member having a threaded shank at one end thereof accommodated in said opening and extending from said other end of said body into said chamber in sliding telescoping, relative rotating relation with said one end of said first member; and bearing means at other ends of said members for engagement with said pulleys, whereby rotation in one direction of said body, relative to said members effects elongation of said tool.

2. A tool as set forth in claim 1 wherein said one end of said first member has a socket therein for the accommodation of said shank of said second member.

3. A tool as set forth in claim 1 wherein said first member comprises a plurality of separate parts removably coupled in end-to-end relation.

4. A tool as set forth in claim 3 wherein each of said plurality of parts has a socket at one end thereof and a stem at the other end thereof removably accommodated in the socket of the adjacent part.

5. A tool as set forth in claim 4 including cooperable retaining means on at least one of said parts for separably maintaining said parts in assembled relation.

6. A tool as set forth in claim 4 including cooperable retaining means on each of said parts for separably maintaining said parts in assembled relation.

7. A tool as set forth in claim 6 wherein said retaining means comprises radially compressible and expansible ring means on one of said parts and a groove in the other of said parts for removable accommodation of said ring means.

8. A tool as set forth in claim 1 wherein each of said bearing means comprises an arm adapted to be accommodated in the groove of its associated pulley, whereby said members are non-rotatable relatively to said pulleys.

9. A tool as set forth in claim 8 wherein each of said arms is arcuate.

10. A tool as set forth in claim 8 wherein opposite sides of said arm are flat and taper toward a point beyond said arm.

* * * * *